Sept. 28, 1948.  W. D. HERSHBERGER  2,450,341
SENSITIVE DISTANCE MEASUREMENT DEVICE
Filed Sept. 28, 1940  2 Sheets—Sheet 1
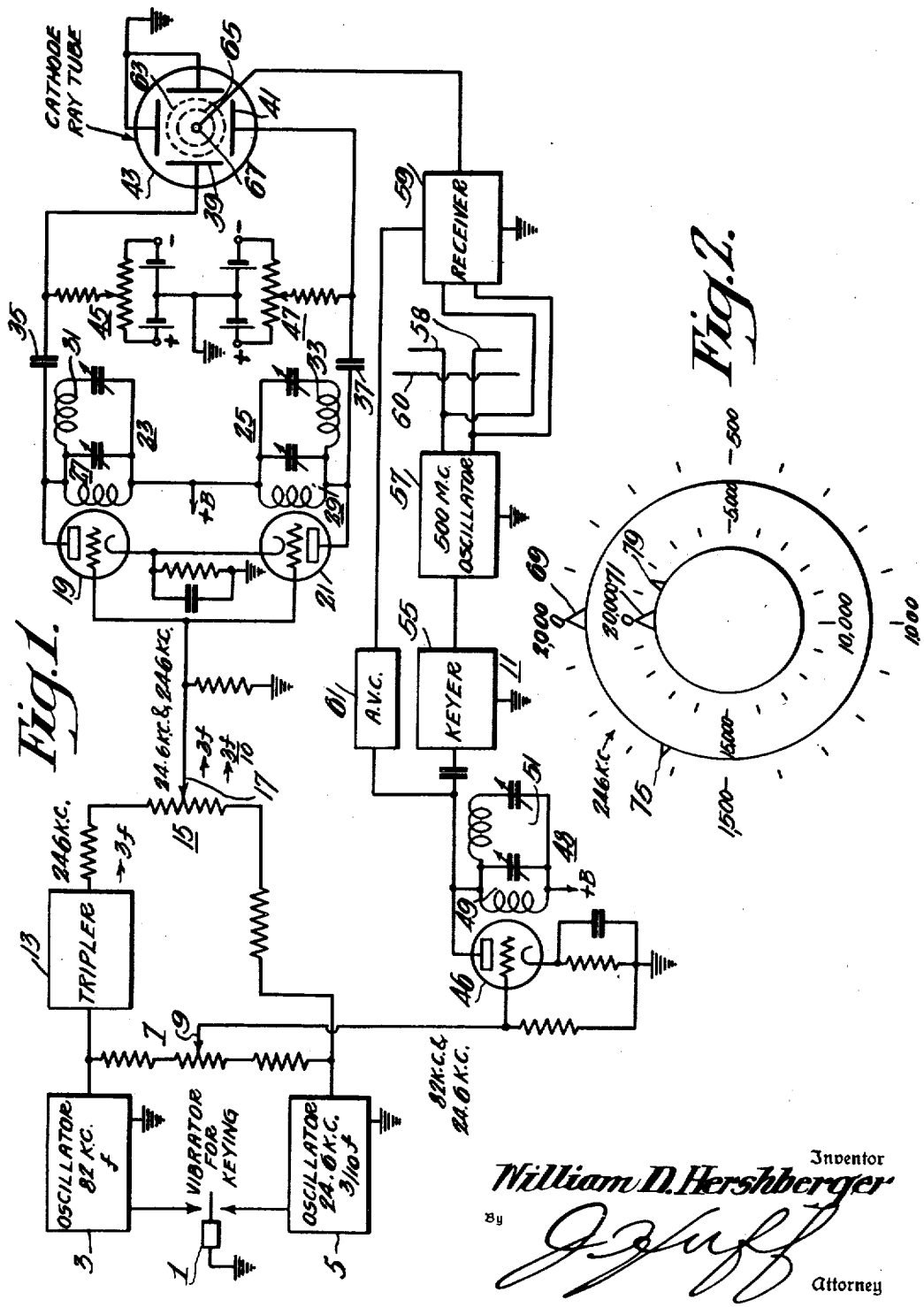

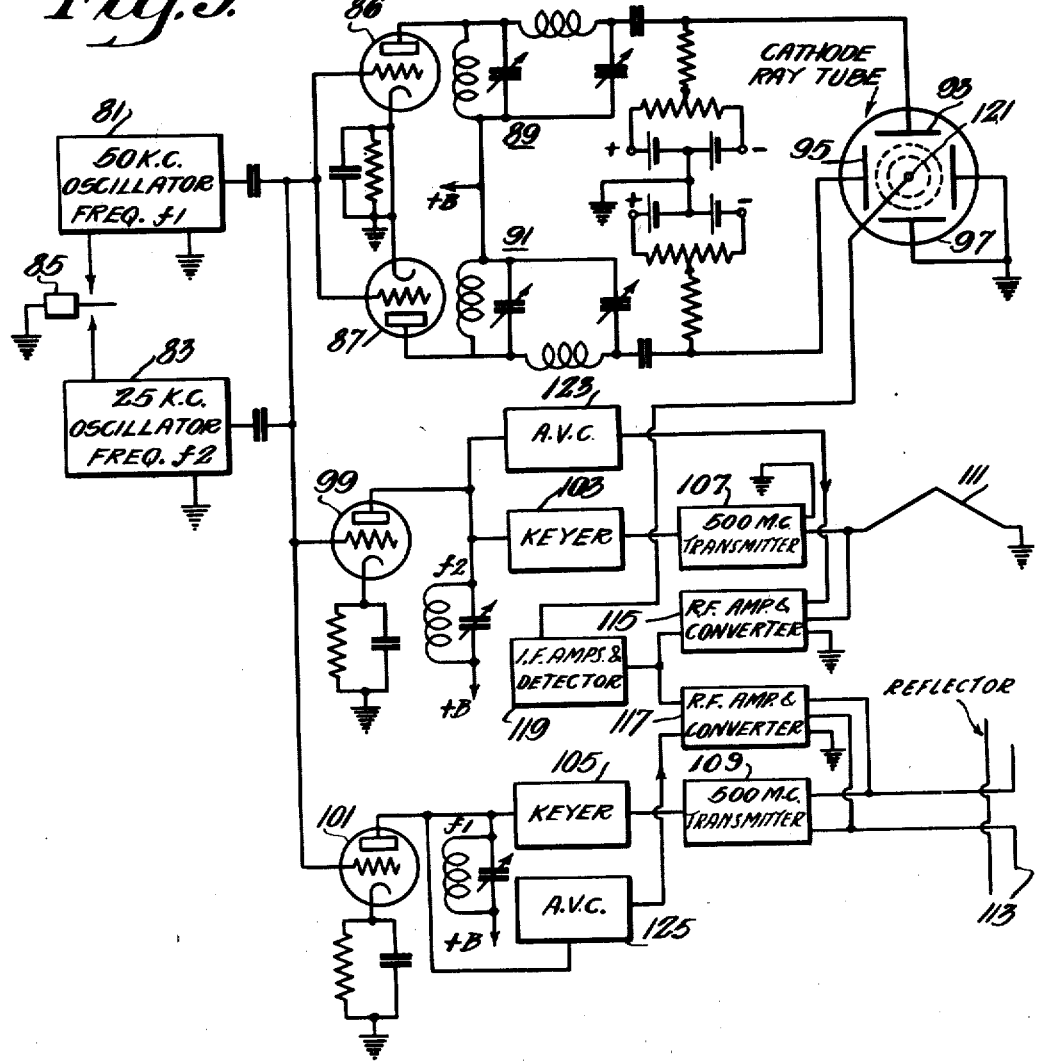

Patented Sept. 28, 1948

2,450,341

UNITED STATES PATENT OFFICE 2,450,341

SENSITIVE DISTANCE MEASUREMENT DEVICE

William D. Hershberger, Haddonfield, N. J., assignor to Radio Corporation of America, a corporation of Delaware Application September 28, 1940, Serial No. 358,776

13 Claims. (Cl. 343—13)

This invention relates to distance measurement devices and particularly to a sensitive distance measurement device of the type in which a radio pulse echo system is used in conjunction with a cathode ray indicator having main and vernier scales.

The measurement of distance as a function of the time of propagation of a radio wave from a transmitter to a reflecting object and back to a receiver is known to those skilled in the art. One of the earlier uses of radio echo distance measurement was the determination of the height of the Heaviside layer. In such measurements no high degree of accuracy is required. In more exacting uses, such as altimeters for aircraft, a very high degree of accuracy may be required.

By way of example, an accuracy of plus or minus twenty feet throughout the range of a few hundred to twenty thousand feet may be demanded. The radio pulse echo type altimeters generally use a cathode ray tube having a fluorescent screen three to nine inches in diameter upon which a single scale would be too crowded for accurate observation. While a longer helical scale might be used, the operators are not accustomed to use such scales. It is therefore desirable to employ a main scale and a vernier scale. The use of main and vernier scales requires two rates of pulse transmission and corresponding rates of cathode ray deflection with attendant difficulties.

It is an object of the invention to provide improved means for obtaining highly accurate pulse echo distance measurement indications. Another object is to provide improved means whereby a pulse echo device may include an indicator with a main scale and a vernier scale. Another object is to provide means for measuring alternately distances bearing a ratio of the order of ten by means of a pulse echo device. An additional object is to provide means whereby a sensitive pulse echo device may be keyed alternately at a high rate and a low rate whereby distances may be indicated with a high degree of accuracy. A still further object is to provide means for indicating alternately on separate scales the altitude of an aircraft and obstacles along its course.

The invention will be described by referring to the accompanying drawings in which Figure 1 is a schematic diagram of one embodiment of the invention; Figure 2 is a graphic illustration of the main and vernier scales of the indicator of the invention; and Figure 3 is a schematic diagram of a modification of the invention applied to an aircraft altitude and obstacle detector.

Similar reference characters will be applied to similar elements in the several figures of the drawing.

Referring to Fig. 1, a vibrator keying device 1 is arranged so that its movable contact alternately keys a first oscillator 3 and a second oscillator 5. A potentiometer network 7 connects the oscillators by a lead 9 to a transmitter 11 as will be explained hereinafter. The output of the first oscillator is connected to a frequency tripler stage 13. The outputs of the second oscillator and the tripler are applied to a second potentiometer network 15. The movable contact 17 of the potentiometer is connected to the grids of a pair of thermionic amplifier tubes 19, 21. The outputs of the amplifiers are applied, respectively, to tunable networks 23, 25. The networks each include a parallel tuned circuit 27, 29 which is shunted by a series tuned circuit 31, 33. The amplifier outputs are also connected through blocking capacitors 35, 37 to the horizontal 39 and to the vertical 41 deflecting elements of a cathode ray tube 43. The deflecting elements are connected to centering networks 45, 47.

Now returning to the lead 9 which is connected to the grid of a sine wave amplifier 46 at the input of the transmitter 11. The output of the amplifier 46 includes a tunable network 48, which has a shunt circuit 49, and a series circuit 51. The output of the sine wave amplifier is connected through a blocking capacitor to a keyer stage 55, which may be of the type disclosed in the copending application Serial No. 182,418, filed December 30, 1937, by Irving Wolff, for "Apparatus for and method of pulse keying," which matured into Patent No. 2,403,624, issued July 9, 1946. Other types of keyers may be used.

The keyer controls the transmitter proper 57, which may, by way of example, include an oscillator and amplifier operating at 500 megacycles per second. The transmitter output is applied to an antenna 58 which is preferably directive downwardly by means of a reflector 60. The same antenna may be connected to a radio receiver 59, as described in the copending application Serial No. 184,354, filed January 11, 1938, now Patent No. 2,401,717 which issued June 4, 1946, by Wolff and Hershberger, for "Signaling system." Separate antennas may be used for transmitting and receiving. A cyclic form of automatic sensitivity control 61 is connected between the transmitter 11 and receiver 59 to prevent overloading of the latter during keying. One form of control is disclosed in the copending application Serial No. 267,475, filed April 12, 1939, by Rogers Smith, entitled "Radio echo distance measuring devices." The invention may be used without controlling automatically the receiver sensitivity, if the receiver is sufficiently shielded from the transmitter, or if the outgoing transmitter pulses do not cause objectionable blurring of the indicator. A small response to the outgoing pulse is desirable to mark the zero of the scale.

The operation is as follows: The oscillators 3 and 5 are started alternately by the vibrator 1 and are tuned to produce currents of frequency $f$ and $\frac{1}{3}f$, respectively. The former frequency is tripled with the result that currents of $3f$ and $\frac{1}{3}f$ are applied to the amplifier tubes 19 and 21 in proportions determined by the adjustment of the second potentiometer 15. The amplifiers include tunable networks 23, 25. The adjustment of these amplifiers is such as to produce a pair of tuning circles as is described more fully in copending application Serial No. 358,462, filed September 26, 1940, by William R. Hershberger for "Sweep generator" upon which U. S. Patent 2,312,761 was granted on March 2, 1943.

In the meantime, sine wave currents of frequencies $f$ and $\frac{1}{3}f$ have been applied to the sine wave amplifier 45 in proportions determined by the adjustment of the first potentiometer 7. The tuning of networks 48 and 49 may be varied to advance or retard in phase the sine wave currents of frequencies $f$ and $\frac{1}{3}f$ so that the keyer is excited at such times as to bring into coincidence the positions of the outgoing pulses on the cathode ray trace on the main and vernier scales with the zeros of the altimeter scales with which the device is furnished. The keyer causes a sharply defined pulse to be radiated by the transmitter for each circular sweep of the main scale, and a pulse every third sweep of the vernier scale. This mode of keying minimizes confusion which might otherwise appear if the vernier sweep were keyed for every sweep due to the well known repetitive characteristics of echo distance measurement devices. Furthermore, keying at the reduced rate reduces the power consumed by the transmitter. The received echo signals are applied to the radial deflecting electrode 61 of the cathode ray tube. By way of example, Fig. 2 illustrates the main and vernier scales calibrated for 20,000 feet and 2,000 feet, respectively. The reference numerals 69 and 71 represent outgoing pulses; 79 and 75 represent the echo signals. The signals indicate an altitude of 1640 feet. Of course, if the altimeter is used beyond its normal range, the indications might correspond to 21,640, 41,640, etc., but no ambiguity can arise on this account if reference is made to a barometric altimeter.

The method of keying the oscillators and of obtaining therefrom two rotating fields for rotating the cathode ray may be applied to a combined altitude and obstacle indicator as shown in Fig. 3. The oscillators 81, 83 are keyed alternately by a vibrator 85. The oscillaotr outputs are applied through amplifiers 86, 87 to the networks 89, 91 and to the deflecting electrodes 93, 95 of a cathode ray tube 97. In this arrangement, no tripling is necessary, but it may be used as the cathode ray sweeps and scales are independent.

The outputs of the oscillators are also applied to a pair of amplifiers 99, 101 which have in their respective ouptputs, a circuit resonant to the currents applied by the oscillators. Thus the amplifier will respond to the current to which its output circuit is resonant. The amplifiers 99, 101 are connected respectively, through keyers 103, 105 and transmitters 107, 109, to a forwardly directive antenna 111 and downwardly directive antenna 113. The antennas are connected to the input of separate radio frequency amplifiers and frequency converting circuits 115, 117. The converted outputs are applied to a common intermediate frequency amplifier and detector 119. The detector output is applied to the radial deflecting electrode 121 of the cathode ray tube 97.

In the operation of the system illustrated in Figure 3, the horizontally directive antenna radiates sharply defined pulses which are projected in a beam-like pattern in a forward direction with respect to the aircraft carrying the device. The vertically directive antenna is used to radiate the pulses toward the earth to determine the altitude of the aircraft. The two systems—obstacle and altitude—will operate alternately and independently. If operated at a switching rate sufficiently high, owing to the persistence of vision, the indications will appear simultaneously and each transmitter will actuate automatically the corresponding receiver which will provide a corresponding cathode ray distance indication. Automatic sensitivity controls 123, 125 may be used to control the receiver to prevent overloading during the radiation outgoing pulses and during the reception of echoes from nearby objects.

Thus the illustrated embodiments of the invention involve a pulse echo distance measurement device or method in which two distance indicating scales are provided. These scales may be independent for the indication of altitude and obstacles, or may be related to provide main and vernier scales. The indicator is a cathode ray tube in which the ray is rotated in accordance with voltages derived from alternately keyed oscillators, the rates of rotation being independent or related to provide a desired ratio. Means are provided for keying the transmitter or transmitters in synchronism with the cathode ray sweeps. It should be understood that the method may be practiced by other means. For example, other types of keyer may be used such as a multivibrator; the switching may be done electronically; separate transmitting and receiving antennas may be employed; and cyclic automatic sensivity control may be omitted.

I claim as my invention:

1. A distance measuring device including in combination a pair of oscillators for generating currents of different frequencies, means for keying alternately said oscillators, a cathode ray tube including means for rotational and radial deflection of said ray, means for applying the outputs of said oscillators to said rotational deflecting means to rotate said ray at rates of angular rotation corresponding to the frequencies of said oscillators, means for transmitting sharply defined pulses, second keying means interconnecting said oscillators and said transmitting means, means for receiving the transmitted pulses after reflection, and means for applying voltages derived from said receiving means to said radial deflecting means to deflect said ray radially.

2. A distance measuring device including in combination a pair of oscillators for generating currents of different frequencies, means for keying alternately said oscillators, a cathode ray tube including means for rotational and radial deflection of said ray, means for applying the outputs of said oscillators to said rotational deflecting means to rotate said ray at different rates, means for transmitting sharply defined pulses, second keying means interconnecting said oscillators and said transmitting means, means for receiving the transmitted pulses after reflection, and means for applying voltages derived from said receiving means to said radial deflecting means to deflect said ray radially.

3. A distance measuring device including in combination a pair of circuits for generating and deriving currents of different frequencies, means for keying alternately said circuits, a cathode ray tube including means for rotational and radial deflection of said ray, means for applying the keyed outputs of said circuits to said rotational deflecting means to rotate said ray at rates of angular rotation corresponding to the frequencies of said currents, means for transmitting sharply defined pulses, second keying means interposed between said circuits and said transmitting means and selectively responsive to said keyed currents, means for receiving the transmitted pulses after reflection, and means for applying voltages derived from said receiving means to said radial deflecting means to deflect said ray radially.

4. A distance measurement device including in combination a pair of oscillators for generating currents having a frequency ratio of $f$ to $\frac{1}{10}f$, means for keying alternately said oscillators, means for tripling the higher of said frequencies to obtain currents having a frequency of $3f$, a cathode ray tube having means for rotational and radial deflection of said ray, means for applying alternately said currents of $3f$ and $\frac{1}{10}f$ to said deflecting means to rotate said ray, means for transmitting sharply defined pulses, second keying means interposed between said transmitting means and said oscillators and responsive to said generated currents so that said transmitter is keyed alternately at the frequencies $f$ and $\frac{1}{10}f$ in synchronism with said first mentioned keying means, means for receiving the transmitted pulses after reflection, and means for applying voltages derived from said receiving means to said deflecting means to deflect said ray radially.

5. A distance measurement device including in combination a pair of oscillators for generating currents having a frequency ratio of $f$ to $\frac{1}{10}f$, means for keying alternately said oscillators, means for tripling the higher of said frequencies to obtain currents having a frequency of $3f$, a cathode ray tube having means for rotational and radial deflection of said ray, means for applying alternately said currents of $3f$ and $\frac{1}{10}f$ to said deflecting means to rotate said ray, means for transmitting sharply defined pulses, means connected to said transmitting means for radiating said pulses in a beam, second keying means interposed between said transmitting means and said oscillator and responsive to said generated currents so that said transmitter is keyed alternately at the frequencies $f$ and $\frac{1}{10}f$ in synchronism with said first mentioned keying means, means for receiving the radiated pulses after reflection, and means for applying voltages derived from said receiving means to said deflecting means to deflect said ray radially.

6. A distance measurement device including in combination means for generating alternately currents having different frequencies of oscillation, impedance networks connected to said generating means, a cathode ray tube having means for rotational and radial deflections of said ray, means for applying voltages derived by impressing said currents through said impedance networks to said deflecting means to rotate said ray at said frequencies, means for generating high frequency currents, keying means connected to said high frequency generator and responsive to said generating currents of different frequencies to form sharply defined pulses of radio frequency energy, means for radiating said pulses, means for receiving said pulses after reflection, and means for applying voltages derived from said receiving means to said deflecting means to deflect radially said ray.

7. A distance measurement device including in combination means for generating alternately currents having frequencies of oscillation corresponding to $f1$ and $f2$, impedance networks connected to said generating means, a cathode ray tube having means for rotational and radial deflections of said ray, means for applying voltages derived by impressing said currents through impedance networks to said deflecting means to rotate said ray at said frequencies, means for generating high frequency currents, keying means connected to said high frequency generator and to said means for generating currents of different frequencies to form sharply defined pulses of radio frequency energy at frequencies corresponding to said $f1$ and $f2$, means for radiating said pulses at frequency $f1$ and $f2$ along differently directive paths, means for receiving said pulses after reflection, and means for applying voltages derived from said receiving means to said deflecting ments to deflect radially said ray.

8. The method of measuring distance by means including a cathode ray tube which includes the steps of generating alternately currents of different frequencies, applying said currents to derive voltages to rotate alternately said ray at angular rates corresponding to said different frequencies, applying said currents to release sharply defined pulses of energy, radiating said pulses, receiving said pulses after reflection, and modifying said rotating ray in response to said pulses to indicate reception of said reflections and the distance to the reflecting object.

9. The method of measuring distance by means including a cathode ray tube which includes the steps of generating alternately currents of frequencies $f$ and $\frac{1}{10}f$, tripling the frequency of currents of frequency $f$, applying said currents to derive voltages of $3f$ and $\frac{1}{10}f$ to rotate alternately said ray at angular rates corresponding to said different frequencies, applying said currents of frequencies $f$ and $\frac{1}{10}f$ to release sharply defined pulses of energy, radiating said pulses, receiving said pulses after reflection, and modifying said rotating ray in response to said pulses to indicate reception of said reflections and the distance to the reflecting object.

10. The method of measuring distance by means including a cathode ray tube which includes the steps of generating alternately currents of frequencies $f1$ and $f2$, applying said currents to derive voltages to rotate alternately said ray at angular rates corresponding to said different frequencies, applying said currents to release sharply defined pulses of energy, radiating said pulses along paths disposed at substantially 90° to each other, receiving said pulses after reflection, and modifying said rotating ray in response to said pulses to indicate reception of said reflections and the distance to the reflecting object.

11. In a device of the character of claim 6, means for varying the ratio of the diameters of said rotational deflection of said cathode ray.

12. In a device of the character of claim 6, means for varying the amplitude ratio of the currents applied from said generating means to said keying means.

13. In a device of the character of claim 6, means for varying the ratio of the diameters of said rotational deflections of said cathode ray, and means for varying the amplitude ratio of the currents applied from said generating means to said keying means.

WILLIAM D. HERSHBERGER.

REFERENCES CITED

The following references are of record in the file of this patent:

UNITED STATES PATENTS

| Number | Name | Date |
|---|---|---|
| 2,055,883 | Terry | Sept. 29, 1936 |
| 2,172,395 | McSpadden | Sept. 12, 1939 |
| 2,189,549 | Hershberger | Feb. 6, 1940 |